US007143690B2

(12) United States Patent
Börjesson et al.

(10) Patent No.: US 7,143,690 B2
(45) Date of Patent: Dec. 5, 2006

(54) SCREW COMPRESSOR FOR COMPRESSING WET MATTER AND A METHOD FOR COMPRESSING AND WASHING

(75) Inventors: Lennart Börjesson, Hammarö (SE); Roland Eriksson, Hammarö (SE)

(73) Assignee: Mastec Stålvall Aktiebolag, Partille (SE)

( * ) Notice: Subject to any disclaimer, the term of this patent is extended or adjusted under 35 U.S.C. 154(b) by 0 days.

(21) Appl. No.: 10/511,347

(22) PCT Filed: Apr. 17, 2003

(86) PCT No.: PCT/SE03/00619

§ 371 (c)(1),
(2), (4) Date: Oct. 15, 2004

(87) PCT Pub. No.: WO03/086739

PCT Pub. Date: Oct. 23, 2003

(65) Prior Publication Data

US 2005/0160923 A1 Jul. 28, 2005

(30) Foreign Application Priority Data

Apr. 18, 2002 (SE) .................................... 0201184

(51) Int. Cl.
*B30B 9/02* (2006.01)
*B30B 9/14* (2006.01)
*B01D 33/60* (2006.01)

(52) U.S. Cl. ........................ 100/117; 100/37; 100/145; 210/414; 210/415; 210/770

(58) Field of Classification Search .................. 100/37, 100/74, 75, 117, 127, 129, 145–150; 162/18, 162/38, 56, 60; 210/414, 415, 770, 791
See application file for complete search history.

(56) References Cited

U.S. PATENT DOCUMENTS

| | | | | | |
|---|---|---|---|---|---|
| 793,267 | A * | 6/1905 | Barth | .......................... | 127/20 |
| 808,193 | A | 12/1905 | Bussells | | |
| 1,382,056 | A * | 6/1921 | Bontemps et al. | .......... | 210/210 |
| 2,355,091 | A | 8/1944 | McDonald | | |
| 3,044,391 | A | 7/1962 | Pellett | | |
| 4,041,854 | A | 8/1977 | Cox | | |
| 4,838,995 | A * | 6/1989 | Klausen | ....................... | 162/18 |

FOREIGN PATENT DOCUMENTS

| | | |
|---|---|---|
| DE | 2908842 | 9/1980 |

(Continued)

*Primary Examiner*—Lowell A. Larson
*Assistant Examiner*—Jimmy T. Nguyen
(74) *Attorney, Agent, or Firm*—Kilpatrick Stockton LLP

(57) ABSTRACT

The invention relates to a screw compressor for compressing matter that passes through the screw compressor. The screw compressor comprises a screw having an outer thread with a pitch that decreases in the longitudinal direction of the screw, and a casing that encases the screw. The casing has an inner side that faces the thread of the screw so that matter may be passed ahead through the screw compressor between the screw and the inner side of the casing in a direction from an inlet end of the screw compressor, where the pitch of the screw thread is greater, to an outlet end of the screw compressor, where the pitch of the screw thread is smaller. Appliances are arranged on the inner side of the casing to prevent matter that passes through the screw compressor from rotating along with the screw. Inside the screw, a conduit is arranged for introduction of liquid. The invention also relates to a method for compressing and dewatering.

13 Claims, 6 Drawing Sheets

FOREIGN PATENT DOCUMENTS

| | | |
|---|---|---|
| EP | 0988962 | 3/2000 |
| WO | WO 9630198 | 10/1996 |

* cited by examiner

SCREW COMPRESSOR FOR COMPRESSING WET MATTER AND A METHOD FOR COMPRESSING AND WASHING

TECHNICAL FIELD

The present invention relates to a screw compressor for compressing matter, particularly wet matter, that passes through the screw compressor. The invention also relates to a method for compressing and dewatering wet matter such as domestic waste matter or fibrous pulp for example.

BACKGROUND OF THE INVENTION

Screw presses (screw compressors) are used for compression and/or dewatering of bulk matter. The purpose of this may be to attain a decrease in volume or to separate solid matter from liquid. A typical screw press comprises a rotatable screw that is encased in a casing. Screw presses are shown in SE 178 147 and U.S. Pat. No. 4,838,995, for example. In a screw press, it is desirable that the matter that passes through the screw press is brought to pass straight through the screw press without following the rotation of the screw. In order to prevent matter from following the rotation of the screw, it has been suggested in the above mentioned SE 178 147 to use counterstays inserted between the screw threads, in order to prevent a rotation tendency in the pulp that is fed through a screw press. Certain types of bulk matter may contain substances that are to be sorted out or separated from the rest of the matter. Certain types of waste matter may e.g. contain residues of fat and protein that is desirable to wash out, because organic matter may be worthwhile to recover. Domestic waste matter is advantageously broken up and diluted with water before compression, in order to achieve an extra washing effect. In paper pulp, it may be desirable to remove residual chemicals, acids or residual alkali for example. Yet another screw press for removal of chemicals from pulp is known from U.S. Pat. No. 2,355,091. This prior art device comprises a screw that is placed inside a casing that has an outer wall and an inner wall. It is stated that the inner wall consists of a plate that is pervious to liquid. A channel is formed between the screw and the inner wall, the cross-sectional area of which being progressively reduced in a direction towards an outlet end of the screw press. In one section of the screw however, the depth of the screw increases so that the cross-sectional area of the channel suddenly increases. In this section, liquid is introduced from an internal chamber in the screw, via holes in the screw. Thereafter, the channel once again decreases in the direction towards the outlet end. It is stated that the liquid that is delivered accordingly is expressed through the holes in the pervious plate of the inner wall, without creating any back pressure. The objective of the present invention is to provide a screw compressor and a method for compressing and washing matter, to achieve a more efficient washing of the matter that passes through the screw compressor and to more efficiently make use of such liquid that is introduced during the compression.

BRIEF ACCOUNT OF THE INVENTION

The invention relates to a screw compressor for compressing matter that passes through the screw compressor. The screw compressor comprises a screw having an outer thread with a pitch that decreases in the longitudinal direction of the screw, and a casing that encases the screw. The casing has an inner side that faces the thread of the screw so that matter may be passed ahead through the screw compressor between the screw and the inner side of the casing in a direction from an inlet end of the screw compressor, where the pitch of the screw thread is greater, to an outlet end of the screw compressor, where the pitch of the screw thread is smaller. The screw compressor is disposed to axially press liquid that is pressed out from the matter, backwards in the longitudinal direction of the screw and in direction towards the inlet end of the screw compressor. Accordingly, the liquid that is pressed out from the matter will flow in counter current in relation to the matter, where after the liquid flows out via one or more holes that preferably are arranged in connection with the inlet end of the screw compressor. Preferably, the degree of compression in the screw compressor is constant from the inlet end to the outlet end. The constant degree of compression contributes to create a back pressure so that the liquid will flow in counter current to the matter.

On the inside of the casing, there are appliances that are arranged to prevent matter that passes through the screw compressor from rotating along with the screw, but instead to pass essentially straight ahead in the longitudinal direction of the screw. Inside the screw, a conduit is arranged for supply of liquid. The conduit has a mouth on the outside of the screw so that liquid may be fed through the screw and be delivered to matter that passes through the screw compressor. The mouth is arranged on the outer surface of the screw, in order thereby to rotate with the screw so that liquid that is introduced via the conduit is uniformly delivered to the matter that passes the screw compressor. The liquid supplied accordingly is pressed in counter current to the matter and in a direction towards the inlet end of the screw compressor. As is mentioned above, the degree of compression in the screw compressor is constant from the inlet end of the screw compressor to the outlet end of the screw compressor, in a preferred embodiment. Then, there will be no interruption on the compression at the point where the liquid is introduced from the inside of the screw. The supplied liquid will then be exposed to a back pressure in direction towards the inlet end of the screw compressor. The supplied liquid will then be used, on its way towards the inlet end of the screw compressor, for rinsing of the matter that travels in the opposite direction. Thereby, the thus supplied liquid is efficiently used.

The mouth is arranged closer to the outlet end of the screw compressor than to its inlet end, so that liquid can be supplied to the matter that passes through the screw compressor when the matter already has been exposed to compression over more than half of the length of the screw compressor. Preferably, the mouth is arranged close to the outlet end of the screw compressor so that the distance from the mouth to the end of the thread is 20% of the length of the screw at the most and preferably so that the distance from the mouth to the end of the thread is 10% of the length of the screw at the most.

Preferably, the screw is a symmetrically compressing screw.

The invention also relates to a method for compressing and washing wet matter in a screw compressor. The matter that is to be compressed and washed may be wet domestic waste matter e.g., that contains residues of fat and proteins. The inventive method comprises the following steps. The wet matter is compressed, whereby the wet matter is dewatered. Preferably, the wet matter is symmetrically compressed so that it is compressed equally much from all sides. After the wet matter has reached a dry content of at least 35%, a washing agent is supplied to the dewatered material.

Even more preferably, the washing agent is supplied only after the matter has reached a dry content of at least 40% and most preferably at least 45%. After the supply of the washing agent, the material is additionally compressed. When the matter consists of domestic waste matter containing organic substances, the washing agent may consist of warm water. If the matter consists of pulp, the washing agent may for example consist of sodium hydroxide (NaOH) for raising of pH, acid for adjusting of pH or chlorine dioxide ($ClO_2$) for bleaching and removal of lignin from the pulp. The washing agent is pressed in counter current in relation to the compressed matter. Thereby, an efficient use of the washing agent is achieved.

The inventive method may advantageously be practiced by aid of the inventive screw compressor. Accordingly, it should be understood that the inventive method may comprise such steps and measures that follow as a matter of course from using the inventive screw compressor, notwithstanding if such steps or measures are explicitly mentioned or not. The method may accordingly comprise the providing of a screw compressor comprising a screw having an outer thread with a pitch that decreases in the longitudinal direction of the screw, and a casing that encases the screw. The casing has an inner side that faces the thread of the screw so that matter may be passed ahead through the screw compressor between the screw and the inner side of the casing in a direction from an inlet end of the screw compressor, where the pitch of the screw thread is greater, to an outlet end of the screw compressor, where the pitch of the screw thread is smaller. Then, wet matter is supplied to the inlet end of the screw compressor, where after the screw is operated to feed the wet matter that is supplied to the inlet end of the screw compressor, ahead through the screw compressor in a direction towards the outlet end of the screw compressor. The wet matter is directed so that the matter is prevented from rotating along with the screw and instead moves essentially straight through the screw compressor. The wet matter is dewatered by compression in the screw compressor, until the wet matter has reached a dry content of at least 35%. Thereafter, a washing agent is supplied to the dewatered matter, whereby the washing agent is supplied to the dewatered matter through the rotating screw so that the washing agent is uniformly supplied to the dewatered matter. Additional compression of the dewatered matter takes place in the screw compressor after the washing agent has been supplied through the screw. The washing agent supplied accordingly is pressed in counter current in a direction towards the inlet end of the screw compressor. It should also be understood that the inventive screw compressor in a corresponding manner is arranged for execution of the inventive method and exhibits the features that are necessary therefore, notwithstanding if these features are explicitly mentioned or not.

DETAILED DESCRIPTION OF THE INVENTION

Figure 1:
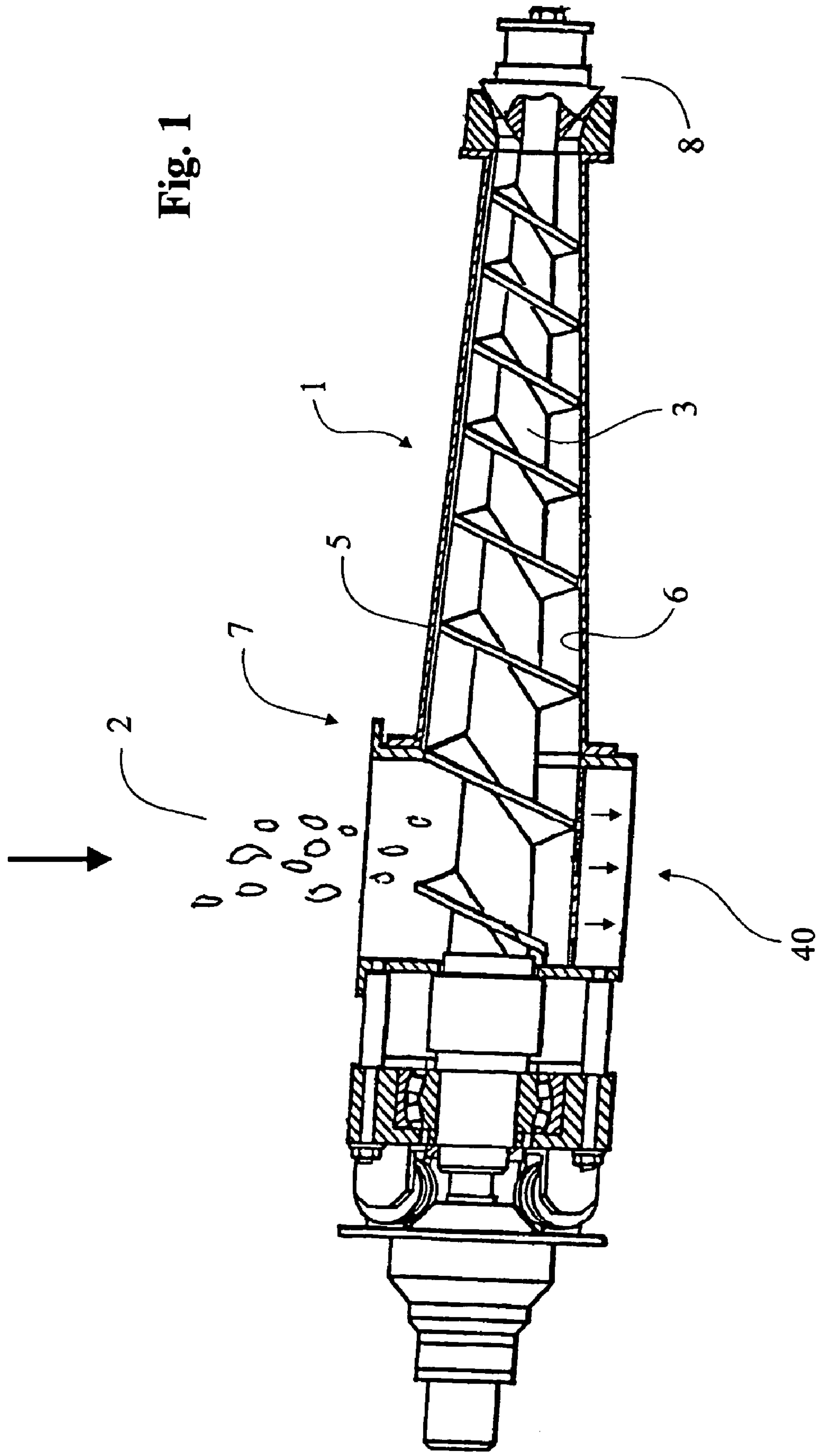
FIG. 1 diagrammatically shows a screw compressor.
Figure 2:
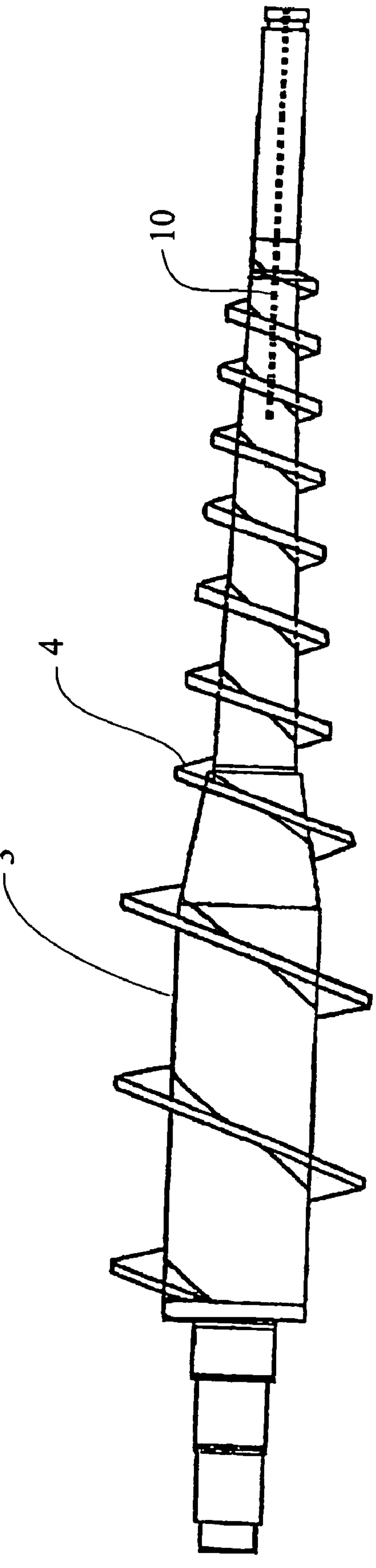
FIG. 2 shows a screw suitable to be used in the inventive screw compressor.

The invention relates to a screw compressor 1 for compressing matter 2 that passes through the screw compressor 1. The inventive screw compressor comprises a screw 3 having an outer thread 4 with a pitch that decreases in the longitudinal direction of the screw 3, and a casing 5 that encases the screw 3. The casing has an inner side 6 that faces the thread 4 of the screw 3 so that matter may be passed ahead through the screw compressor 1 between the screw 3 and the inner side of the casing 5 in a direction from an inlet end 7 of the screw compressor, where the pitch of the screw 3 thread 4 is greater, to an outlet end 8 of the screw compressor 1, where the pitch of the screw 3 thread 4 is smaller. The screw 3 and the casing 5 have a section that is tapered in the operating direction of the screw compressor and that preferably is conically tapered. In a corresponding manner, the inside of the casing 5 is conically tapered too. The screw compressor further comprises appliances 9 on the inside of the casing, that are arranged to prevent matter that passes through the screw compressor from rotating along with the screw 3, so that the matter instead will pass essentially straight ahead in the longitudinal direction of the screw 3. The screw compressor 1 further comprises a conduit 10 arranged inside the screw 3, for supply of liquid, which conduit 10 has at least one mouth 11 on the outside of the screw 3, so that liquid may be fed through the screw 3 and be delivered to matter that passes through the screw compressor 1. The mouth 11 is arranged on the outer surface of the screw 3, in order thereby to rotate with the screw 3 so that liquid that is introduced via the conduit 10 is uniformly delivered to the matter that passes the screw compressor 1. The screw compressor 1 is designed to press the liquid that is supplied via the mouth 11 (or mouths 11) in counter current and in a direction towards the inlet end 7 of the screw compressor 1, i.e. in a direction axially backwards. In order to achieve such a backwards flow, the degree of compression in the screw compressor 1 is preferably such that no decrease in the degree of compression occurs, at least not in the area where liquid is to be supplied. Hence, the compression is undiminished when washing agent is supplied. Suitably, the degree of compression can be constant from the inlet end 7 to the outlet end 8 of the screw compressor. The constant degree of compression contributes to create a back pressure so that the liquid will flow in counter current to the matter. Furthermore, the casing 5 of the screw compressor is, at least over a part of its length, a water-tight casing that is impervious to liquid or essentially impervious to liquid. Thereby, liquid is prevented from being pressed out radially, but instead pressed-out liquid will move axially. Preferably, the casing 5 is impervious to liquid (or essentially impervious to liquid) over the greater part of the area between the inlet end 7 of the screw compressor 1 and its outlet end 8. In a preferred embodiment, the casing 5 is impervious to liquid in the entire area between the inlet end 7 of the screw compressor 1 and the outlet end 8 of the screw compressor. One or more liquid outlet holes 40 are arranged in connection with the inlet end 7 of the screw compressor 1. Washing agent and liquid that is pressed out from the matter that is displaced through the screw compressor 1 moves axially backwards and flows out through the outlet hole 40 or outlet holes 40.

The mouth 11 is preferably arranged closer to the outlet end 8 of the screw compressor 1 than to its inlet end 7, so that liquid can be supplied to the matter that passes through the screw compressor 1 when the matter already has been exposed to compression over more than half of the length of the screw compressor 1. Preferably, the mouth 11 is arranged close to the outlet end 8 of the screw compressor 1, so that the distance from the mouth 11 to the end of the thread 4 is 20% of the length of the screw 3 at the most and even more preferred 10% of the length of the screw 3 at the most.

Figure 3:
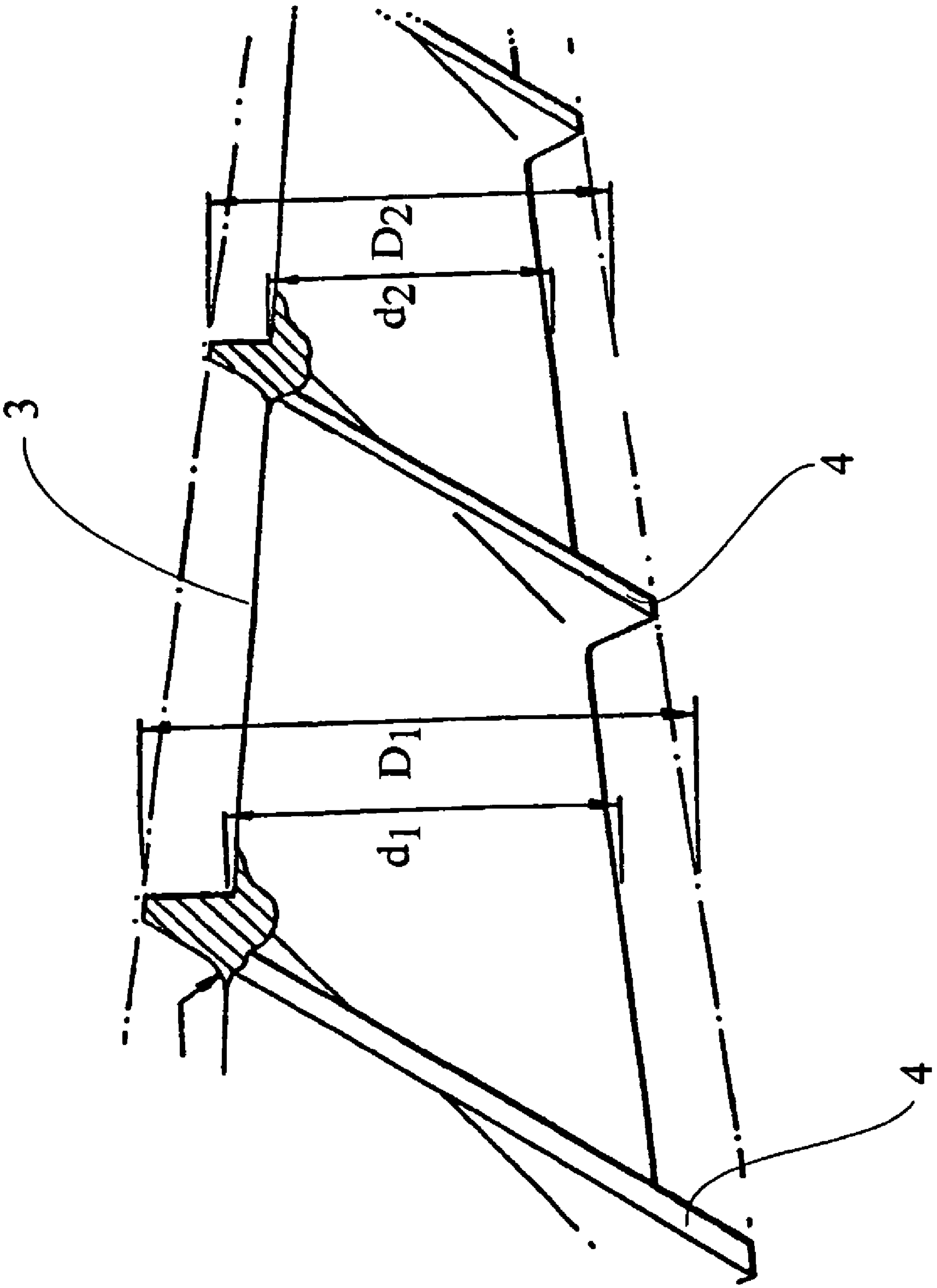
FIG. 3 shows an advantageous embodiment of the screw.
Figure 4:
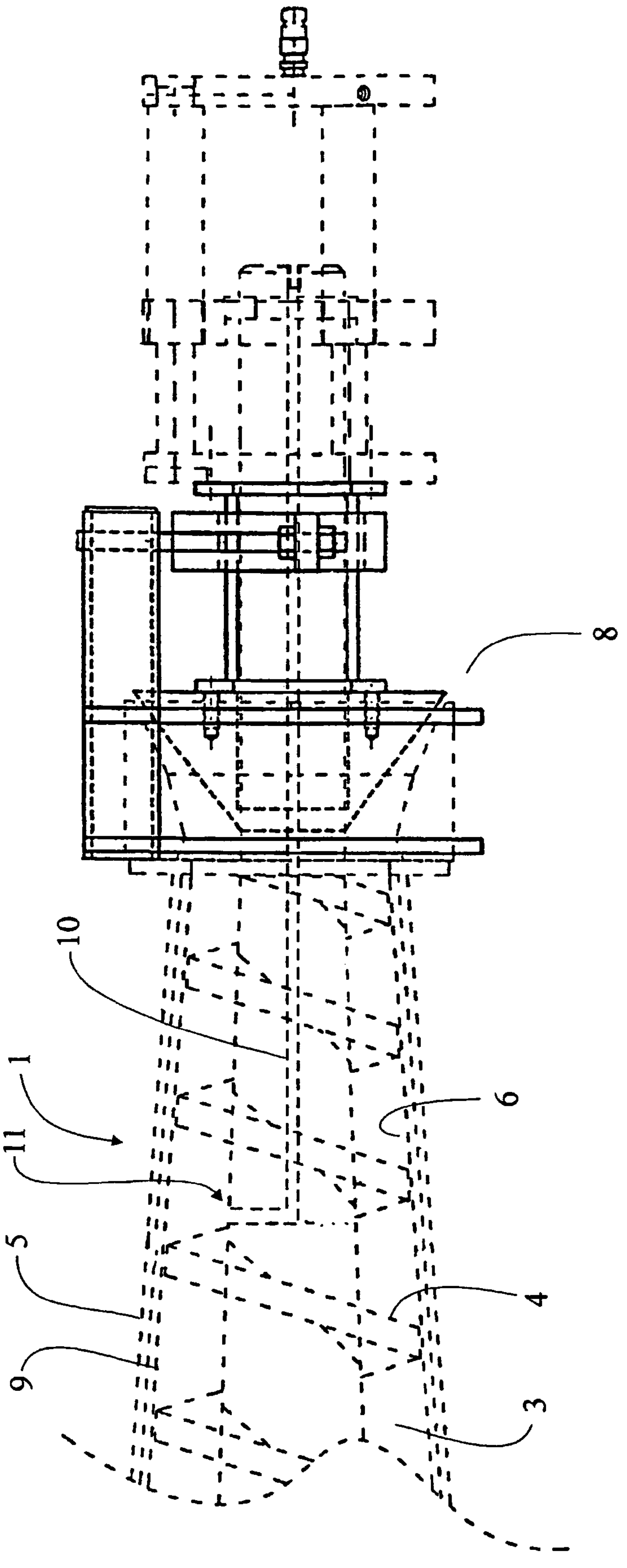
FIG. 4 shows a front end of the screw compressor.
Figure 5:
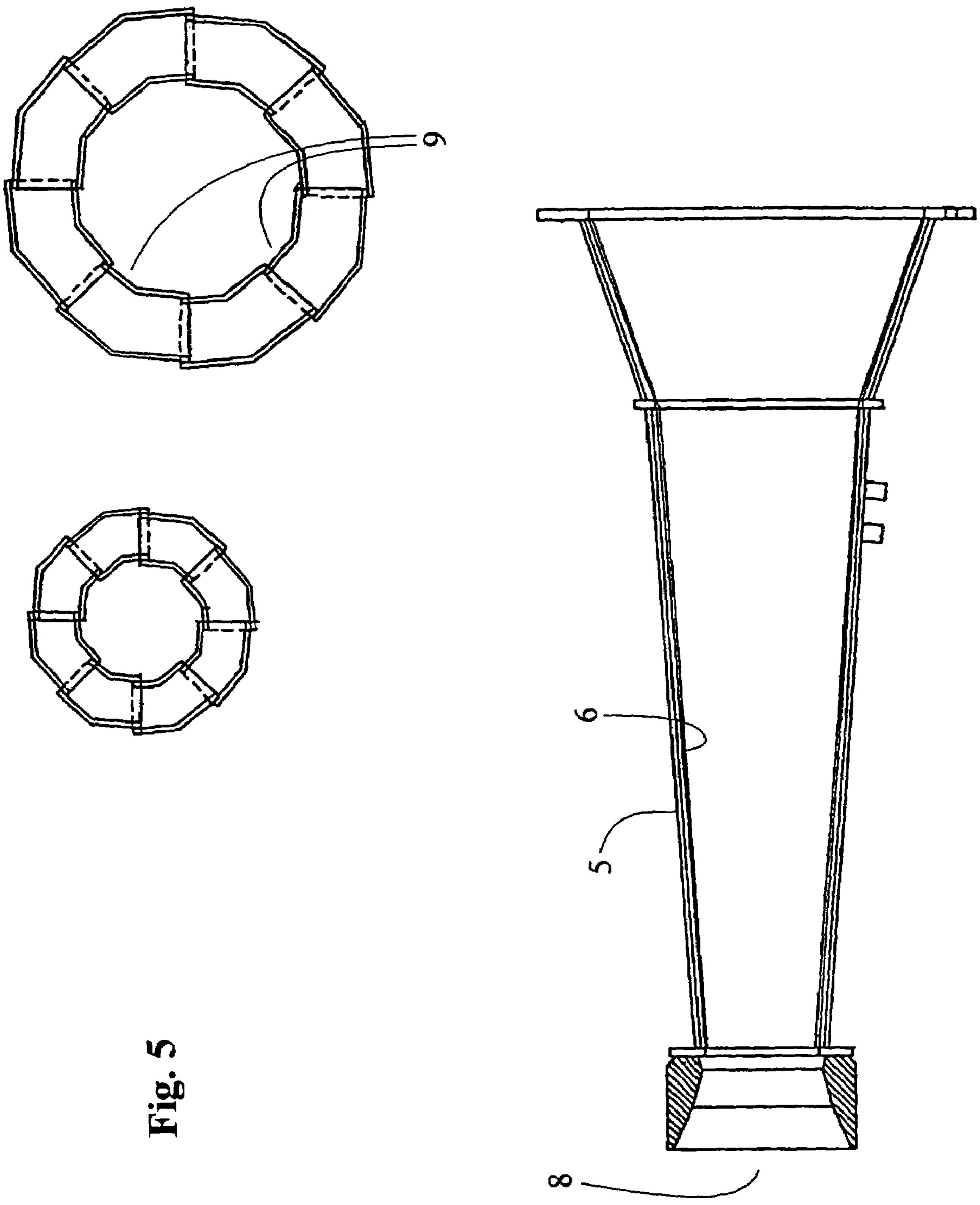
FIG. 5 shows an example of a suitable design of the casing.
Figure 6:
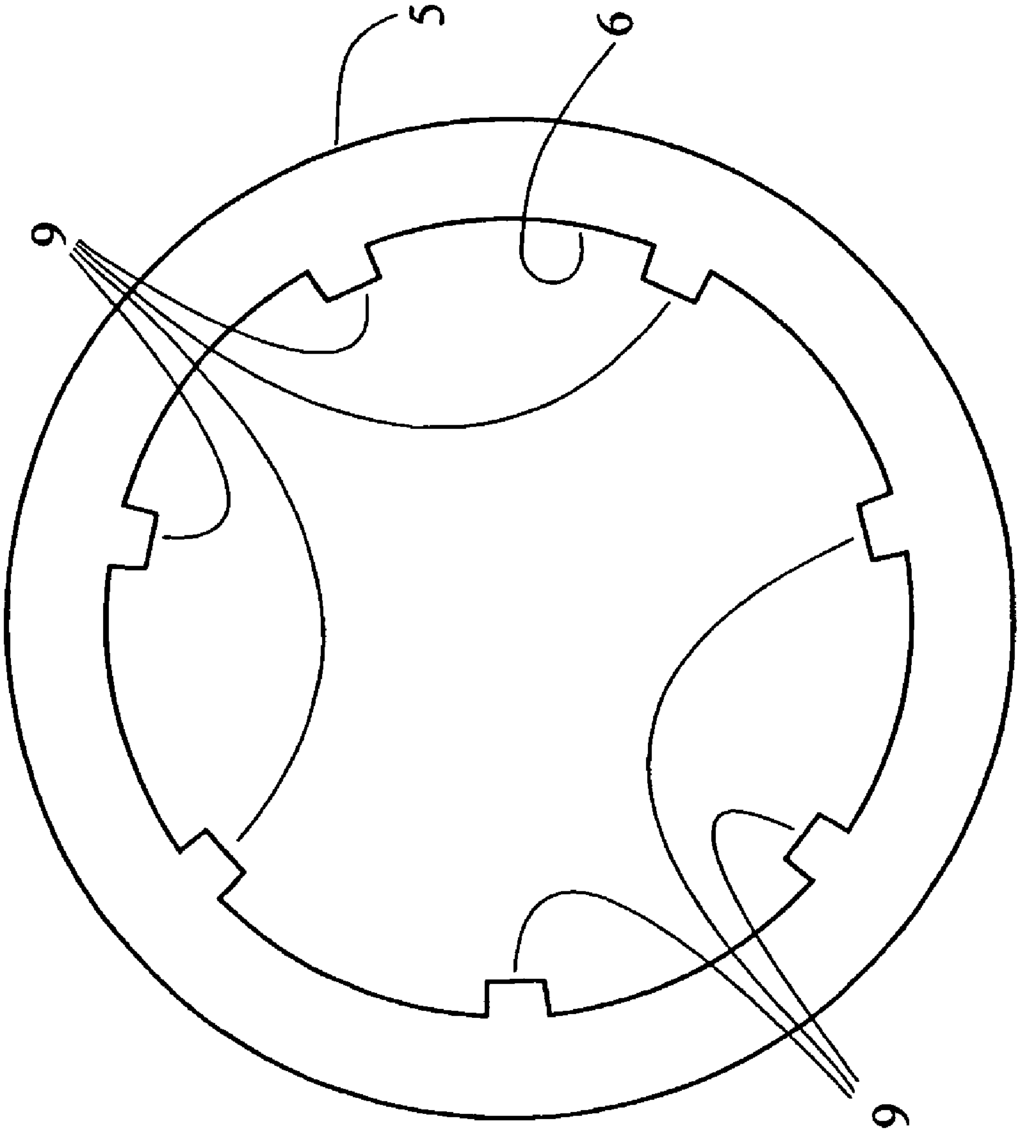
FIG. 6 shows, as seen in cross-section, another conceivable design of the casing.

It is now referred to FIG. 3. Over at least a part of its length, the screw 3 is preferably a symmetrically compressing screw 3, so that the screw compressor 1 is a symmetrically, i.e. uniformly, compressing screw compressor over at least a part of the length of the screw compressor. Such a screw and screw compressor, respectively, are described in Swedish patent application No. 9501118-5 that corresponds to U.S. Pat. No. 5,960,711. Then, the screw compressor is designed such that the compression takes place linearly and uniformly at the transport of the matter through the screw compressor, i.e. the volume inside the conical part of the screw compressor decreases with essentially the same factor per length unit along the entire length of the conical part of the screw compressor and the compression of one volume unit in the screw is essentially equal in all directions so that the shape of the matter inside the screw compressor can be resembled by a helicalised square rod, all four sides of which being equally tapered towards the outlet end 8. This may be achieved by the screw being dimensioned such that an outer diameter D of the screw thread and the diameter d of the screw core, over at least the main part of the extension of the screw, change axially in the screw compressor from a first axial position in which the outer diameter of the screw thread=$D_1$ and the diameter of the screw core=$d_1$, to a second axial position that is situated later in the travelling direction of the matter, in which the outer diameter of the screw thread=$D_2$ and the diameter of the screw core=$d_2$, according to the formulae $$D_2 = \frac{D_1}{\sqrt[n]{K}} \qquad d_2 = \frac{d_1}{\sqrt[n]{K}}$$

where K is a compression ratio, i.e. the volume of the matter in the first position in relation to the volume of the matter in the second position and n is an number between 2.5 and 3.5, preferably between 2.7 and 3.3, suitable between 2.9 and 3.1. In the ideal case, n=3. This is described in greater detail in Swedish patent application No. 9501118-5 and U.S. Pat. No. 5,960,711.

The invention also relates to a method for compressing and washing matter in a screw compressor 1. The matter that is to be compressed and washed may be wet domestic waste matter that contains fat and proteins. According to the inventive method, wet matter 2 is compressed to dewater the wet matter while the wet matter is pressed forwards through a compressor. Preferably, the compression is performed symmetrically so that the wet domestic waste matter 2 is compressed equally much from all sides. When the matter has been dewatered to a dry content of at least 35%, a washing agent is supplied to the compressed matter. The washing agent may be a fat and/or protein dissolving washing agent. More preferably, the washing agent is supplied only after the matter has reached a dry content of at least 40% and most preferably at least 45%. After supply of the washing agent, additional compressing of the domestic waste matter 2 takes place. The supplied washing agent is pressed axially backwards, i.e. in a direction that is counter current to the direction of the matter that is compressed, so that the washing agent efficiently will rinse the matter that is compressed. The washing capacity can be measured by controlling pH, the content of residual chemicals e.g., or by comparing the amount of organic matter before and after washing.

The inventive method may advantageously be practiced by aid of the inventive screw compressor 1. The method may accordingly comprise the providing of a screw compressor 1 comprising a screw 3 having an outer thread 4 with a pitch that decreases in the longitudinal direction of the screw 3, and a casing 5 that encases the screw 3. The casing 5 has an inner side 6 that faces the thread 4 of the screw so that matter may be passed ahead through the screw compressor 1 between the screw 3 and the inner side 6 of the casing 5 in a direction from an inlet end 7 of the screw compressor, where the pitch of the screw 3 thread 4 is greater, to an outlet end 8 of the screw compressor 1, where the pitch of the screw 3 thread 4 is smaller. Wet matter is supplied to the inlet end 7 of the screw compressor. Thereafter the screw 3 is operated to feed the wet matter that is supplied to the inlet end 7 of the screw compressor, ahead through the screw compressor 1 in a direction towards the outlet end 8 of the screw compressor. The wet matter is 2 directed so that it is prevented from rotating along with the screw 3 and instead moves essentially straight through the screw compressor. Then, the wet matter is dewatered by the compressing in the screw compressor 1. The liquid that is removed from the wet matter is pressed axially backwards through the screw compressor 1 in a direction towards the inlet end 7 of the screw compressor 1. When the wet matter has reached a dry content of at least 35%, a washing agent is supplied to the dewatered matter, whereby the washing agent is supplied to the dewatered matter through the rotating screw 3 so that the washing agent is uniformly supplied to the dewatered matter. Thereafter, the dewatered matter is additionally compressed, after the supply of washing agent. The supplied washing agent is pressed axially backwards in a direction towards the inlet end 7 of the screw compressor 1. Then, the washing agent travels counter current in relation to the matter that is being compressed. Thereby, the washing agent is used efficiently. In a preferred embodiment of the invention, the wet matter is dewatered to a dry content of at least 40%, before the washing agent is supplied. Most suitably, the wet matter is dewatered until it has reached a dry content of at least 45% before the washing agent is supplied. Preferably, the washing agent is supplied during undiminished compression of the wet matter. Preferably, the degree of compression is constant during the entire course of events, all the way from the inlet end 7 of the screw compressor 1 to its outlet end 8. Preferably, the wet matter should be uniformly compressed during its passage through the screw compressor. It is an advantage if the dry content is high when the washing agent is supplied.

When the invention is used for compression of domestic waste matter, the organic matter that is washed out from the waste matter may be recovered, by the organic matter being transported to a digestion tank and being used for production of hydrogen gas for example. It is also possible to recover minerals from the organic matter, which minerals can be used for fertilisers for example.

Such a method may then comprise compressing of the wet domestic waste matter 2, whereby the wet domestic waste matter 2 is dewatered while the waste matter is being pressed forward through a compressor and whereby the compressing preferably takes place symmetrically, so that the wet domestic waste material 2 is equally much compressed from all sides. Advantageously, the compressor may consist of the inventive screw compressor 1 described above. Thereafter, a fat and/or protein dissolving washing agent is supplied to the compressed and dewatered domestic waste matter, the washing agent being supplied only after the domestic waste matter 2 has reached a dry content of at least 35%, more preferably at least 40% and most preferably at least 45%. After addition of the washing agent, the domestic waste matter is additionally compressed to rinse and/or press out organic matter from the domestic waste matter by the addition of washing agent and the compression following thereupon. Thereby, in a preferred embodiment, the washing agent is brought to flow in a direction that is opposite to the direction in which the domestic waste matter moves during the compression. Thereafter, the organic matter separated from the domestic waste matter is recovered by placing the organic matter in a digestion tank where after hydrogen gas is extracted from the organic matter in the digestion tank.

By washing agent being supplied only at the end of the screw, when the matter has reached a high dry content, the advantage is attained that the washing agent is not as much diluted as would be the case if the washing agent has been supplied earlier on in the process.

By washing agent being supplied via a rotating mouth to the matter that is fed straight ahead, the advantage is attained that the washing agent is uniformly distributed.

By no interruptions existing in the compressing in the area where liquid/washing agent is supplied, it is easier to achieve the desired effect that the supplied washing agent is pressed backwards in a direction towards the inlet end of the screw compressor. It should also be understood that by a constant degree of compression in the screw compressor, not only the supplied washing agent will be pressed backwards towards the inlet end of the screw compressor but also liquid present in the wet matter will flow backwards towards the inlet end during compression.

By the screw compressor compressing uniformly, so that the degree of compression is constant, this contributes to achieve a backwards flow of liquid.

By the casing of the screw compressor being impervious to liquid, the advantage is attained that liquid/washing agent is prevented from being pressed radially outwards, but instead liquid/washing agent can be pressed axially backwards.

By the conduit's 10 mouth 11 being arranged closer to the outlet end of the screw compressor than to its inlet end, the advantage is obtained inter alia that the wet matter obtains a considerable increase in dry content before the washing agent is supplied.

By the screw and the inside of the casing being conically tapered in a direction towards the outlet end of the screw compressor, an efficient compression is attained.

The invention claimed is:

1. A screw compressor for compressing and separating liquid from matter that passes through the screw compressor, the screw compressor comprising:

a screw having a longitudinal direction and an outer threading, the outer threading having a pitch, wherein the pitch decreases in the longitudinal direction of the screw;

a casing that encases the screw, the casing having an inner side that faces the thread on the screw so that matter can be fed forward through the screw compressor between the screw and the inner side of the casing in a direction from an inlet end of the screw compressor where the pitch of the screw thread is greater, to an outlet end of the screw compressor where the pitch of the screw thread is smaller;

appliances on the inner side of the casing, that are arranged to prevent matter that passes through the screw compressor from rotating along with the screw but instead to pass essentially straight ahead in the longitudinal direction of the screw;

a conduit for liquid supply arranged inside the screw and provided with a mouth on the outside of the screw so that liquid can be fed through the screw and be supplied to matter that passes through the screw compressor, the mouth being arranged on the outer surface of the screw in order thereby to rotate along with the screw so that liquid that is supplied via the conduit is uniformly supplied to the matter that passes through the screw compressor;

wherein the casing of the screw compressor is a water-tight casing, which is impervious to liquid in an entire area between the inlet end and the outlet end so that the liquid that is supplied to the matter that passes through the screw compressor is pressed axially backwards through the screw compressor towards the inlet end of the screw compressor and wherein the screw compressor is arranged so that the liquid is supplied to the matter only when the matter has reached a dry content of at least 35%.

2. Screw compressor according to claim 1, characterized in that a degree of compression in the screw compressor is constant from the inlet end to the outlet end.

3. Screw compressor according to claim 1, characterized in that the mouth is arranged closer to the outlet end of the screw compressor than to its inlet end, so that liquid can be supplied to the matter that passes through the screw compressor when the matter has been exposed to compression over more than half the length of the screw compressor.

4. Screw compressor according to claim 3, characterized in that the mouth is arranged close to the outlet end of the screw compressor, so that the distance from the mouth to the end of the thread is at most 20% of the length of the screw.

5. Screw compressor according to claim 3, characterized in that the mouth is arranged close to the outlet end of the screw compressor, so that the distance from the mouth to the end of the thread is at most 10% of the length of the screw.

6. Screw compressor according to claim 1, wherein the liquid is a washing agent.

7. Screw compressor according to claim 1, characterized in that the screw and the inner side of the casing are conically tapered towards the outlet end of the screw compressor.

8. A method for compressing and washing matter in a screw compressor, the method comprising the following steps:

a. providing a screw compressor comprising a screw having a longitudinal direction and an outer threading, the outer threading having a pitch, wherein the pitch decreases in the longitudinal direction of the screw, and a casing that encases the screw, which casing has an inner side that faces the thread on the screw so that matter can be fed forward through the screw compressor between the screw and the inner side of the casing in a direction from an inlet end of the screw compressor, where the pitch of the screw thread is greater, to an outlet end of the screw compressor, where the pitch of the screw thread is smaller;

b. supplying of wet matter to the inlet end of the screw compressor;

c. operating the screw so that the wet matter that is supplied to the inlet end of the screw compressor is fed forward through the screw compressor towards the outlet end of the screw compressor;

d. directing the wet matter so that the wet matter is prevented from rotating along with the screw and instead moves essentially straight through the screw compressor;

e. separating liquid from the wet matter by the compressing in the screw compressor, until the wet matter has reached a dry content of at least 35%;

f. supplying a washing agent to the wet matter with a dry content of at least 35%, whereby the washing agent is supplied to the wet matter with a dry content of at least 35% via the rotating screw so that the washing agent is uniformly supplied to the wet matter with a dry content of at least 35%;

g. additional compressing of the wet matter with a dry content of at least 35%, after the supplying of the washing agent, wherein the casing of the screw compressor is a water-tight casing, which is impervious to liquid in an entire area between the inlet end and the outlet end so that the washing agent that is supplied to the wet matter with a dry content of at least 35% is pressed axially backwards through the screw compressor towards the inlet end of the screw compressor.

9. The method according to claim 8, characterized in that the wet matter is compressed by a degree of compression that is constant from the inlet end of the screw compressor to its outlet end.

10. The method according to claim 8, characterized in that the wet matter is dewatered until it reaches a dry content of at least 40% before the washing agent is supplied to it.

11. The method according to claim 10, characterized in that the wet matter is dewatered until it reaches a dry content of at least 45% before the washing agent is supplied to it.

12. The method according to claim 8, characterized in that the washing agent is supplied during undiminished compression of the wet matter so that the washing agent is exposed to a back pressure.

13. The method according to claim 12, characterized in that the degree of compression is constant all the way from the inlet end of the screw compressor to its outlet end.

* * * * *